United States Patent
Chen

(10) Patent No.: US 7,679,791 B2
(45) Date of Patent: Mar. 16, 2010

(54) METHOD FOR SELECTING AND ADJUSTING SCANNER ILLUMINANT

(76) Inventor: Chun-Jen Chen, No. 14, Lane 123, Shinyi St., Wuchi Jen, Taichung (TW) 435

( * ) Notice: Subject to any disclaimer, the term of this patent is extended or adjusted under 35 U.S.C. 154(b) by 1668 days.

(21) Appl. No.: 10/337,093

(22) Filed: Jan. 6, 2003

(65) Prior Publication Data
US 2004/0130756 A1 Jul. 8, 2004

(51) Int. Cl.
*H04N 1/04* (2006.01)

(52) U.S. Cl. .................. 358/474; 358/475; 358/509; 358/446; 315/247; 315/291; 250/208.1; 345/211; 345/100

(58) Field of Classification Search ............... 358/475, 358/509, 474, 487, 486, 494, 402, 446; 355/233; 235/454; 250/208.1, 214.1, 221, 222.1; 345/211, 100, 212; 348/371, 372, 33.13
See application file for complete search history.

(56) References Cited

U.S. PATENT DOCUMENTS

| | | | | |
|---|---|---|---|---|
| 4,242,730 A * | 12/1980 | Golias et al. | ................... | 356/39 |
| 4,536,077 A * | 8/1985 | Stoffel | ................... | 358/497 |
| 5,164,772 A * | 11/1992 | Andoh | ................... | 399/32 |
| 5,777,508 A * | 7/1998 | Sawanobori | ................ | 327/534 |
| 6,054,707 A * | 4/2000 | Hou | ................ | 250/234 |
| 6,055,387 A * | 4/2000 | Koshio | ................ | 399/55 |
| 6,128,743 A * | 10/2000 | Rothenbaum | ................ | 713/300 |
| 6,344,906 B1 * | 2/2002 | Gatto et al. | ................ | 358/443 |
| 6,459,509 B1 * | 10/2002 | Maciey et al. | ................ | 358/474 |
| 6,549,239 B1 * | 4/2003 | Tao | ................ | 348/371 |
| 6,606,171 B1 * | 8/2003 | Renk et al. | ................ | 358/475 |
| 6,621,474 B2 * | 9/2003 | Nagakubo et al. | ............. | 345/60 |
| 6,704,124 B2 * | 3/2004 | Hu et al. | ................ | 358/473 |
| 6,771,394 B1 * | 8/2004 | Nakanishi et al. | ........... | 358/474 |
| 6,784,410 B2 * | 8/2004 | Ishizuka | ................... | 250/208.1 |
| 6,845,422 B2 * | 1/2005 | Shimada et al. | ............. | 710/305 |
| 6,995,877 B2 * | 2/2006 | Suzuki | ................ | 358/474 |
| 7,006,260 B2 * | 2/2006 | Sato et al. | ................ | 358/448 |
| 7,099,056 B1 * | 8/2006 | Kindt | ................ | 358/509 |
| 7,102,685 B2 * | 9/2006 | Nishimura | ................ | 348/372 |
| 7,110,498 B2 * | 9/2006 | Yamada | ................ | 378/98.8 |
| 7,164,117 B2 * | 1/2007 | Breed et al. | ................ | 250/221 |
| 7,167,284 B2 * | 1/2007 | Sawada | ................ | 358/483 |
| 7,221,488 B2 * | 5/2007 | Khovaylo et al. | ........... | 358/497 |
| 7,289,156 B2 * | 10/2007 | Silverbrook et al. | ........ | 348/374 |
| 7,292,378 B2 * | 11/2007 | Chiba et al. | ................ | 358/473 |
| 2002/0096626 A1 * | 7/2002 | Ishizuka | ................ | 250/208.1 |
| 2003/0007373 A1 * | 1/2003 | Satoh | ................ | 363/60 |

(Continued)

*Primary Examiner*—Negussie Worku
(74) *Attorney, Agent, or Firm*—Stolowitz Ford Cowger LLP

(57) ABSTRACT

A method applied in a scanner for selecting and adjusting scanner illuminants including procedures herein below is provided. Start the scanner; determine what type of power supply the scanner is connected to; select suitable illuminant which fits the adopted power supply; and start to scan. Of which, the power supply adopted is either self power or bus power, while the suitable illuminant is either a high power illuminant or a low power illuminant. Another method including procedures herein below is also provided. Start the scanner; determine what type of power supply is adopted in the scanner; adjust the drive setting for the illuminant which fits the adopted power supply; drive the illuminant; and start to scan. Of which, the power supply adopted is either self power or bus power, while the drive setting for the illuminant is either a high power setting or a low power setting.

28 Claims, 4 Drawing Sheets

U.S. PATENT DOCUMENTS

2003/0058346 A1* 3/2003 Bechtel et al. ......... 348/207.99
2003/0178487 A1* 9/2003 Rogers ....................... 235/454
2003/0189736 A1* 10/2003 Ikeda ......................... 358/475
2004/0130756 A1* 7/2004 Chen .......................... 358/475
2004/0195978 A1* 10/2004 Horiuchi et al. ............. 315/291
2004/0225804 A1* 11/2004 Leete ......................... 710/305
2006/0244860 A1* 11/2006 Nishimura ................... 348/372
2008/0074535 A1* 3/2008 Ohsuga et al. .............. 348/371

* cited by examiner

METHOD FOR SELECTING AND ADJUSTING SCANNER ILLUMINANT

This application incorporates by reference of Taiwan application Serial No. 91134239, filed Nov. 25, 2002.

BACKGROUND OF THE INVENTION

1. Field of the Invention

The invention relates in general to a method for selecting and adjusting scanner illuminants, and more particularly to a scanner illuminant selecting and adjusting method in accordance with the types of power supply.

2. Description of the Related Art

Of all the personal computer peripherals, scanner can be said to be one of the essential peripherals. As for the scanners currently available in the market, types of power supply are adopted: one adopts self power and is connected to an urban power 340 (as shown in FIG. 3), and the other adopts bus power and is connected to a computer host 350 (as shown in FIG. 3).

Since the self power provides the scanner with higher power, the illuminant device installed in a self-powered scanner is allowed to be more power consuming. Under this circumstance, a cold cathode fluorescent lamp (CCFL) is normally used as the illuminant device. The cold cathode fluorescent lamp, although has the advantage of producing a higher level of brightness, is disadvantaged by being more power consuming and inconvenient to use.

Normally, the bus-powered scanner is convenient to use for its power is directly supplied by the computer. Due to the fact that the power supplied by bus power is relatively low, a light emitting diode (LED), which has the advantage of power saving, is normally installed as the illuminant device. The bus-powered scanner has the advantage of power saving, but produces a lower level of brightness when scanning images.

It is understood from the above disclosures that a conventional scanner has the following disadvantages:

1. More purchase costs. Scanners powered by self power and scanners powered by bus power have their individual applicable situations. To assure that different situations are all covered, two scanners covering different types of power supply are needed. Therefore more costs will be expended.

2. Inconvenience of use. While there are situations when quality and speed of image scanning carries more weight than power saving and convenience of use, there are situations when power saving and convenience of use are more important than quality and speed of image scanning. Since different situations require different scanners adopting different types of power supply, inconvenience of use arises.

SUMMARY OF THE INVENTION

It is therefore an object of the invention to provide a method for selecting and adjusting scanner illuminants aiming:

1. to reduce costs of purchase; and
2. to improve convenience of use.

According to the foregoing objectives, a method for selecting and adjusting scanner illuminants whose features are depicted below is provided.

A method for selecting and adjusting scanner illuminants which is applied in a scanner including procedures herein below is provided. Start the scanner; determine what type of power supply the scanner is connected to; select suitable illuminant which fits the adopted power supply; and start to scan. Of which, the power supply adopted is either self power or bus power, while the suitable illuminant is either a high power illuminant or a low power illuminant. Another method including procedures herein below is also provided. Start the scanner; determine what type of power supply is adopted in the scanner; adjust the drive setting for the illuminant which fits the adopted power supply; drive the illuminant; and start to scan. Of which, the power supply adopted is either self power or bus power, while the drive setting for the illuminant is either a high power setting or a low power setting.

Other objects, features, and advantages of the invention will become apparent from the following detailed description of the preferred but non-limiting embodiments. The following description is made with reference to the accompanying drawings.

DETAILED DESCRIPTION OF THE INVENTION

There are two types of conventional scanners in terms of power supply: one is self-powered scanner, the other bus-powered scanner. When it comes to practical use of a scanner, there are advantages as well as disadvantages for both self-powered scanners and bus-powered scanners.

The scanner 310 according to the invention differs with conventional scanners in that the former can use self power as well as bus power as the power supply. According to the invention, the scanner 310 selects the illuminant 320 according to what type of power supply 340 or 350 is used. When the scanner is connected to self power, illuminant 320 with high power and high brightness will be selected as the illumination element. On the other hand, when connected to bus power, the scanner 310 will select illuminant 320 with low power and low brightness as the illumination element. The scanner 310 according to the invention has another method for adjusting illuminants 320. When the scanner 310 is connected to self power, the scanner 310 will use high voltage and high current drive setting to drive the illuminant 320. On the other hand, when connected to bus power, the scanner 310 will use low voltage and low current drive setting to drive the illuminant 320.

Both of the two above mentioned methods can be applied in a scanner regardless which type of power supply the scanner is connected to.

Figure 1:
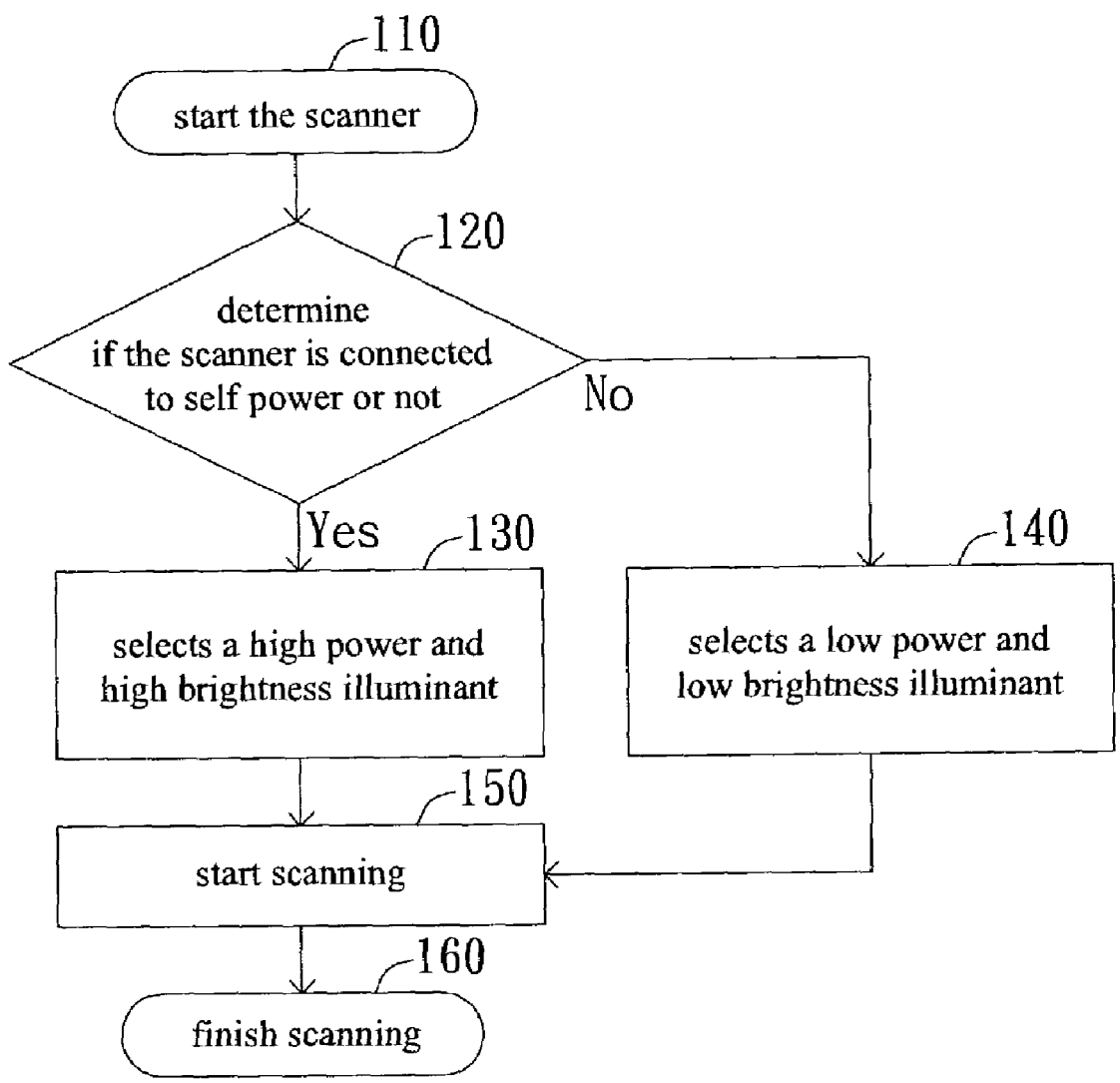
FIG. 1 shows a flowchart of a method for selecting scanner illuminants according to a preferred embodiment of the invention.

Please refer to FIG. 1, a flowchart of a method for selecting scanner illuminants according to a preferred embodiment of the invention is illustrated. The method includes the following procedures. First, the scanner is started in procedure 110. Next, proceed to procedure 120 where the scanner determines what type of power supply is adopted. If the scanner is connected to self power, proceed to procedure 130 where the scanner selects a high power and high brightness illuminant. If the scanner is connected to bus power rather than self power, proceed to procedure 140 where the scanner selects a low power and low brightness illuminant instead. After that, the scanner starts to scan in procedure 150. At last, the scanner finishes scanning in procedure 160.

Figure 4A:
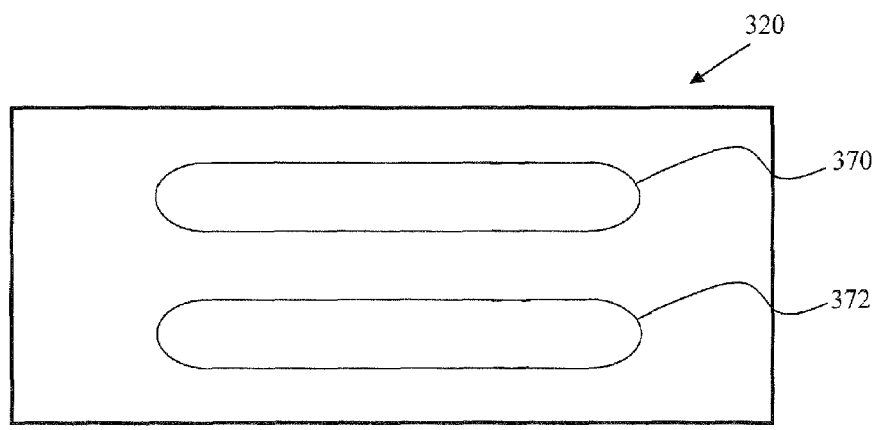
FIGS. 4*a-c* show illuminants according to embodiments of the invention.
Figure 4B:
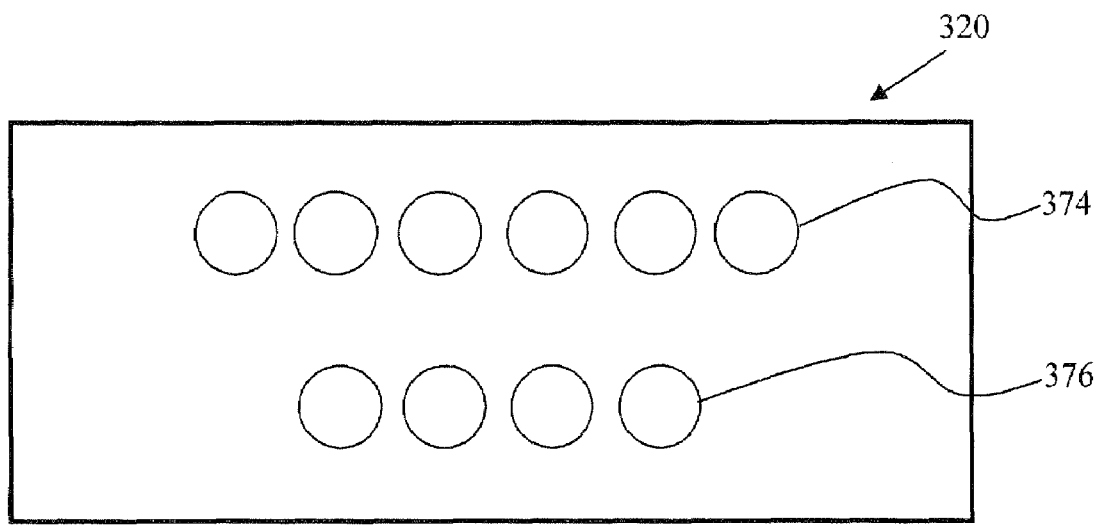
Figure 4C:
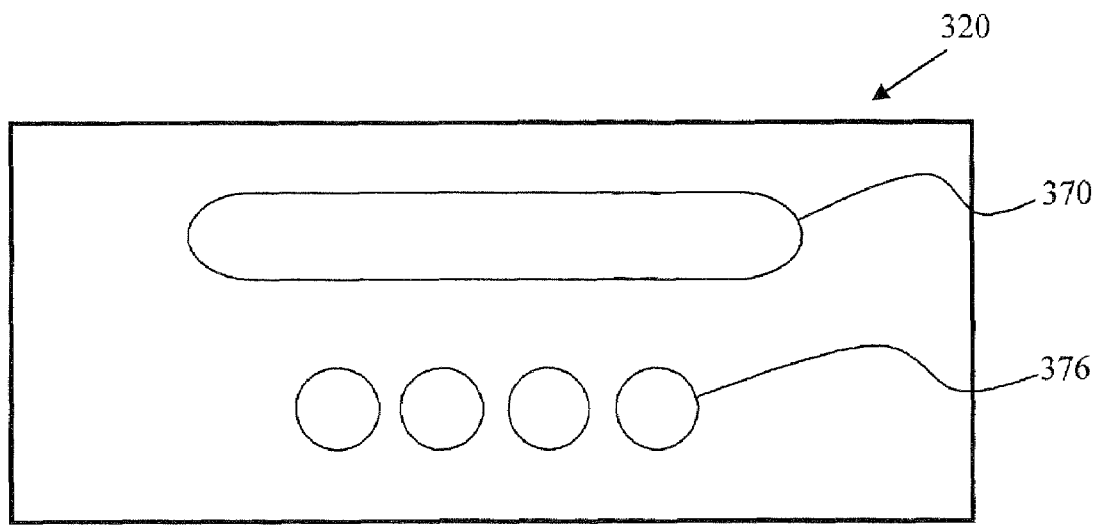

In the above disclosed method, the pairing for an illuminant with high power and high brightness and an illuminant with low power and low brightness are possible. For example, as shown in FIG. 4a, a high power and high brightness CCFL 370 can be paired with a low power and low brightness CCFL 372, a high power and high brightness LED 374 which consists of a larger number of LEDs can be paired with a low power and low brightness LED 376 which consists of a smaller number of LEDs (as shown in FIG. 4b), or a CCFL 370 can be paired with an LED 376 (as shown in FIG. 4c).

Figure 2:
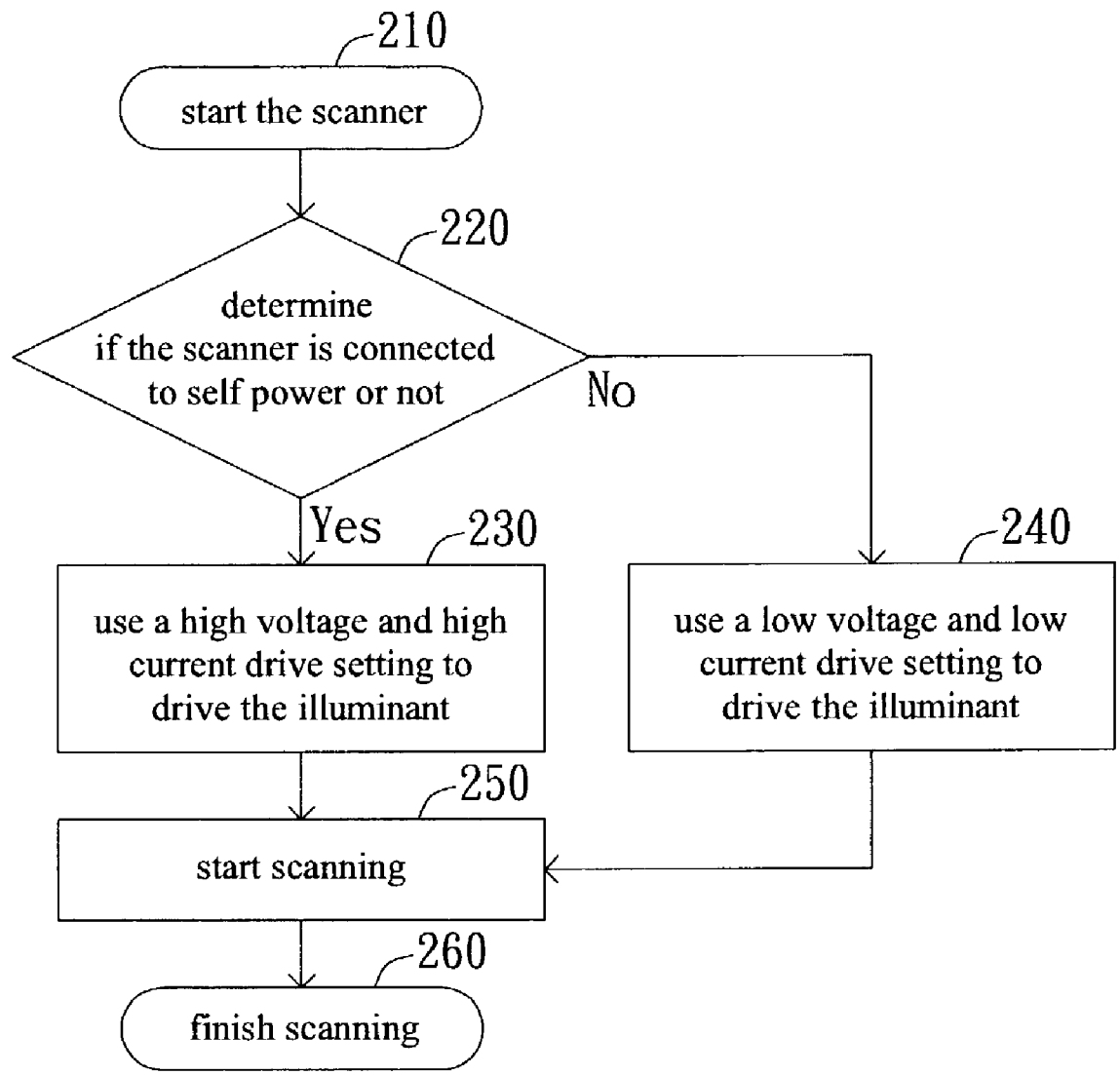
FIG. 2 shows a flowchart of a method for adjusting scanner illuminants according to a preferred embodiment of the invention.
Figure 3:
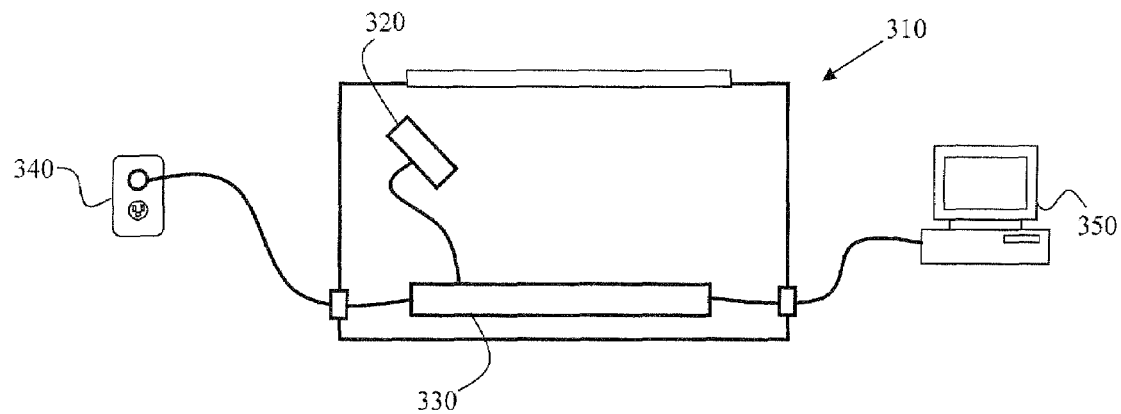
FIG. 3 shows a scanner according to embodiments of the invention.

Please refer to FIGS. 2 and 3, a flowchart of a method for adjusting scanner illuminants 320 according to a preferred embodiment of the invention is illustrated. The method includes the following procedures. First, the scanner 310 is started in procedure 210. Next, proceed to procedure 220 where the scanner 310 determines what type of power supply 340 or 350 is adopted. If the scanner 310 is connected to self power, proceed to procedure 230 where the scanner will adjust the drive setting 330 to be high voltage and high current to drive the illuminant 320. If the scanner 310 is connected to bus power rather than self power, proceed to procedure 240 where the scanner 310 adjusts the drive setting 330 to be low voltage and low current setting to drive the illuminant 320 instead. After that, the scanner 310 starts to scan in procedure 250. At last, the scanner 310 finishes scanning in procedure 260.

In the above method, the illuminant can be a CCFL. While high voltage and high current drive setting for illuminant enables the CCFL to produce a higher brightness, low voltage and low current drive setting for illuminant enables the CCFL to produce a lower brightness. Moreover, the illuminant can consist of a number of LED, high voltage and high current drive setting for illuminant drives all the LEDs to illuminate whereas low voltage and low current drive setting for illuminant drives only part of the LEDs to illuminate.

The above disclosed methods for selecting and adjusting scanner illuminants have at least the following advantages:

1. Saving purchase costs. Self-powered scanners and bus-powered scanners can be combined into one single scanner and thus be applied in different occasions. Regardless of what type of power supply the scanner is connected to, one scanner according to the invention would suffice.

2. Improving convenience of use. The scanner can be connected to self power as well as bus power, hence improving convenience of use.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of operating a scanner, comprising:
   determining what type of power supply the scanner is connected to, wherein the scanner comprises a high-power scanner illuminant device and a low-power scanner illuminant device, and wherein each illuminant device is configured to scan a same side of a document;
   selecting the high-power scanner illuminant device when the scanner is connected to a high-power power supply;
   selecting the low-power scanner illuminant device when the scanner is not connected to the high-power power supply, but is connected to a low-power power supply; and
   performing a scan of the document using the selected scanner illuminant device.

2. The method of claim 1, wherein the high-power power supply comprises self power.

3. The method of claim 1, wherein the low-power power supply comprises bus power provided by a host computer, wherein the host computer is external to the scanner.

4. The method of claim 1, wherein the high-power illuminant device comprises a high-power cold cathode fluorescent lamp (CCFL) and the low-power illuminant device comprises a low-power CCFL.

5. The method of claim 1, wherein the high-power illuminant device comprises a high-power light emitting diode (LED) and the low-power illuminant device comprises a low-power LED.

6. The method of claim 1, wherein the high-power illuminant device comprises a CCFL and the low-power illuminant device comprises a LED.

7. The method of claim 1, further comprising:
   adjusting a scan speed of the scanner, wherein a high speed scan setting is selected when the power supply comprises the high-power power supply and the selected scanner illuminant device comprises the high-power scanner illuminant device, wherein a low speed scan setting is selected when the power supply comprises the low-power power supply and the selected scanner illuminant device comprises the low-power scanner illuminant device, and wherein said performing the scan includes using the adjusted scan speed.

8. An apparatus, comprising: means for determining what type of power supply a scanner is connected to; means for selecting a high-power illuminant device when the scanner is connected to a high-power power supply; means for selecting a low-power illuminant device when the scanner is not connected to the high-power power supply, but is connected to a low-power power supply; and means for performing a scan using the selected illuminant device.

9. The apparatus of claim 8, wherein the high-power power supply comprises self power.

10. The apparatus of claim 8, wherein the low-power power supply comprises bus power.

11. The apparatus of claim 8, further comprising: means for adjusting a scan speed in the scanner, wherein the scan speed is adjusted to be fast when the power supply comprises the high-power power supply and the selected illuminant device comprises the high-power illuminant device, wherein the scan speed is adjusted to be slow when the power supply comprises the low-power power supply and the selected illuminant device comprises the low-power illuminant device, and wherein the scan is performed using the adjusted scan speed.

12. A scanner, comprising:
   a high-power illuminant device; and
   a low-power illuminant device, wherein each illuminant device is configured to scan a same side of a document, and wherein the scanner is configured to:
      select one illuminant device from the group consisting of the high-power illuminant device and the low-power illuminant device based, at least in part, on a level of power supplied to the scanner by a power source;
      adjust a scan speed based on the selected one illuminant device; and
      use only the selected one illuminant device in a single scan of the document.

13. The scanner of claim 12, wherein the scanner selects the high-power illuminant device when the scanner is coupled to a high-power source, wherein the scanner selects the low-power illuminant device when the scanner is coupled to a low-power source and not the high-power source, wherein the scan speed is adjusted to a fast scan speed when the scanner selects the high-power illuminant device, wherein the scan speed is adjusted to a slow scan speed when the scanner selects the low-power illuminant device, and wherein the scanner is configured to perform the single scan by providing power to the selected illuminant device and by using the adjusted scan speed.

14. The scanner of claim 13, wherein the high-power source comprises alternating current.

15. The scanner of claim 13, wherein the low-power source comprises power provided by a computer.

16. The scanner of claim 12, wherein the scan speed is adjusted based, at least in part, on the level of power supplied to the scanner.

17. An apparatus comprising:
a scanner having an illuminant drive setting, wherein the scanner is configured to adjust the illuminant drive setting based, at least in part, on a level of power supplied to the scanner, wherein a high voltage illuminant drive setting is selected when the scanner is coupled to a high-power source, wherein a low voltage illuminant drive setting is selected when the scanner is coupled to a low-power source, and wherein the scanner is configured to perform a scan by providing power to an illuminant device using the selected voltage setting.

18. The apparatus of claim 17, wherein the high-power source comprises alternating current power.

19. The apparatus of claim 17, wherein the low-power source comprises power provided over a USB port.

20. The apparatus of claim 17, wherein a scan speed is adjusted based, at least in part, on the level of power supplied to the scanner.

21. The apparatus of claim 17, wherein a scan speed is adjusted based on the selected illuminant drive setting.

22. The apparatus of claim 21, wherein the scan speed is adjusted to be fast when the selected illuminant drive setting is the high voltage illuminant drive setting, and wherein the scan speed is adjusted to be slow when the selected illuminant drive setting is the low voltage illuminant drive setting.

23. An apparatus comprising:
means for determining what type of power supply a scanner is connected to;
means for selecting a high-power illuminant device when the scanner is connected to a high-power power supply;
means for selecting a low-power illuminant device when the scanner is connected to a low-power power supply;
means for adjusting a scan speed of the scanner based, at least in part, on the type of power supply the scanner is connected to; and
means for performing a scan using the selected illuminant device and the adjusted scan speed.

24. An apparatus comprising:
means for determining what type of power supply a scanner is connected to;
means for selecting an illuminant drive setting in the scanner, wherein a high voltage setting is selected when the power supply comprises a high-power source, and wherein a low voltage setting is selected when the power supply comprises a low-power source;
means for adjusting a scan speed of the scanner, based on the selected illuminant drive setting; and
means for delivering power to an illuminant device using the selected illuminant drive setting to perform a scan at the adjusted scan speed.

25. A method of operating a scanner, comprising:
determining what type of power supply the scanner is connected to;
selecting a high-power illuminant device when the scanner is connected to a high-power power supply;
selecting a low-power illuminant device when the scanner is connected to a low-power power supply;
adjusting a scan speed, based at least in part on the selected illuminant device; and
scanning a document using the selected illuminant device and the adjusted scan speed.

26. The method of claim 25, wherein the high-power illuminant device is configured to scan one side of the document, and wherein the low-power illuminant device is configured to scan the one side of the document.

27. The method of claim 25, wherein one side of the document is scanned using the selected illuminant device.

28. A method of operating a scanner, comprising:
determining what type of power source the scanner is connected to;
selecting an illuminant drive setting in the scanner, wherein a high voltage setting is selected when the power source comprises a high-power source, and wherein a low voltage setting is selected when the power source comprises a low-power source;
adjusting a scan speed of the scanner, based at least in part on the type of power source the scanner is connected to; and
delivering power to an illuminant device using the selected illuminant drive setting to scan an image at the adjusted scan speed.

* * * * *